(12) United States Patent  
Yamashita

(10) Patent No.: US 6,763,726 B2  
(45) Date of Patent: Jul. 20, 2004

(54) MECHANICAL FORCE SENSOR

(75) Inventor: Muneharu Yamashita, Toyama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 32 days.

(21) Appl. No.: 10/329,507

(22) Filed: Dec. 27, 2002

(65) Prior Publication Data

US 2003/0164696 A1 Sep. 4, 2003

(30) Foreign Application Priority Data

Dec. 28, 2001 (JP) ........................................ 2001-400933
Nov. 11, 2002 (JP) ........................................ 2002-326605

(51) Int. Cl.[7] ................................................ G01L 7/00
(52) U.S. Cl. ............................ 73/778; 73/761; 310/26; 338/2
(58) Field of Search ........................ 73/761–763, 778, 73/774; 310/311, 26; 338/2

(56) References Cited

U.S. PATENT DOCUMENTS 5,659,139 A * 8/1997 Okada et al. ................. 73/778
5,737,239 A * 4/1998 Horiuchi et al. .............. 73/778
6,209,400 B1 * 4/2001 Schoch et al. ................ 73/778

FOREIGN PATENT DOCUMENTS

JP 2002-243757 A 8/2002

* cited by examiner

Primary Examiner—Edward Lefkowitz  
Assistant Examiner—Alandra Ellington  
(74) Attorney, Agent, or Firm—Keating & Bennett, LLP

(57) ABSTRACT

A mechanical-force sensor includes two piezoelectric vibrators which are arranged such that stresses in mutually opposite directions are applied thereto by a mechanical force such as an acceleration. A current-voltage converter and signal-summing circuit converts current signals that flow through the two piezoelectric vibrators into voltage signals. A voltage-amplifier and amplitude limiter circuit amplifies a sum signal of the two voltage signals, and provides a positive feedback of a voltage signal that is in phase with the current signals, thereby causing an oscillating operation. A phase difference-voltage converter circuit generates a voltage signal that is proportional to the phase difference between the voltage signals yielded by the conversion. An amplifier and filter circuit DC-amplifies the voltage signal and removes unwanted frequency components therefrom.

19 Claims, 11 Drawing Sheets

MECHANICAL FORCE SENSOR

BACKGROUND OF THE INVENTION

1. Field of the Invention

The present invention relates to a mechanical force sensor for detecting a mechanical force such as an acceleration, an angular acceleration, an angular velocity, or a load.

2. Description of the Related Art

An acceleration sensor including piezoelectric vibrators is disclosed in Japanese Unexamined Patent Application Publication No. 2002-243757 by the assignee of the present application. Japanese Unexamined Patent Application Publication No. 2002-243757 corresponds to U.S. patent application Ser. No. 10/054,858, filed Jan. 25, 2002, now pending.

In the acceleration sensor, a bridge circuit is defined by two piezoelectric vibrators to which stresses in mutually opposite directions are applied by an acceleration, and by load impedances including two capacitors. Furthermore, a voltage-dividing impedance circuit is provided between average outputs thereof, and a signal at the voltage-dividing point of the voltage-dividing impedance circuit is fed back to a node between the two piezoelectric vibrators by a feedback signal processing circuit, whereby an oscillation circuit is provided. A phase difference between oscillation outputs of the average outputs of the bridge circuit is detected and output as an acceleration detection signal.

(1) Factors of Variation in the Circuit Portion

The features of the acceleration sensor include the ability to detect an acceleration associated with a DC component such as gravitational acceleration, not being susceptible to the effect of electrostatic capacitance of the piezoelectric vibrators even when the resonant frequency is high, high sensitivity of detection, and no need to amplify a high-frequency voltage signal by a precise gain.

In the acceleration sensor, however, since a bridge circuit is defined by the two piezoelectric vibrators and the load impedances including two capacitors, the phase difference between oscillation outputs does not become zero unless the bridge becomes balanced. That is, even if stresses applied to the piezoelectric vibrators are both zero, the output of the acceleration sensor does not become zero. Furthermore, although it is an advantage that the load impedances can be adjusted to cancel out the variation between the piezoelectric vibrators when variation between the piezoelectric vibrators is large, if variation between the piezoelectric vibrators is so small from the start that adjustment is not needed, extra processing for equalizing the characteristics of the load impedances is required.

(2) Layout of the Piezoelectric Vibrators and the Circuit

The acceleration sensor, in which electrostatic capacitance is large relative to the load impedances, is not susceptible to the effect of stray capacitance of a circuit board. Thus, it does not require coating or hermetically sealed packaging.

In the acceleration sensor, however, the distance between the piezoelectric vibrators and the circuit must be kept within several cm. This is a constraint attributable to the use of the principle of Colpitts oscillator. That is, the constraint is attributable to the susceptibility to wiring resistance and inductance components due to high input impedance of the circuit and high input voltage to the circuit. Since it is assumed that the distance between the piezoelectric vibrators and the circuit will be 10 cm or longer in some applications, a need exists for a detection method that will work in principle even if the distance between the piezoelectric vibrators and the circuit is large as described above.

(3) Adjustment of Point of Maximal Sensitivity to Acceleration

The acceleration sensor allows sensitivity to acceleration to be adjusted to a maximal point by a phase-shift circuit. However, it is difficult to control the amount of phase shift by the phase-shift circuit.

The problems described above are not specific to acceleration sensors, but are common to cases where currents that flow through piezoelectric vibrators change in accordance with the amount of a mechanical force such as an angular acceleration, an angular velocity, or a load.

SUMMARY OF THE INVENTION

In order to solve the problems described above, preferred embodiments of the present invention provide a mechanical force sensor that eliminates the need for adjustment and reduces variation factors of a circuit portion by reducing variation in characteristics of two piezoelectric vibrators, and that allows the piezoelectric vibrators and the circuit portion to be disposed at a distance from each other, and that eliminates the need of controlling the amount of a phase shift by a phase-shift circuit.

According to a preferred embodiment of the present invention, a mechanical force sensor includes two piezoelectric vibrators to which stresses in mutually opposite directions are applied by a mechanical force, a circuit for applying a voltage signal commonly to the two piezoelectric vibrators, a current-voltage converter circuit for converting current signals that flow through the two piezoelectric vibrators into voltage signals, and a phase-difference signal processing circuit for detecting a phase difference between the output voltage signals of the current-voltage converter circuit and outputting a mechanical force detection signal. Accordingly, the effect on a measurement operation is minimized and stable measurement of a mechanical force is facilitated.

The mechanical force sensor may be such that the circuit for applying a voltage signal commonly to the two piezoelectric vibrators is a voltage amplifier circuit that provides the two piezoelectric vibrators with a positive feedback of a voltage signal from and in phase with a voltage signal obtained by summing the current signals that flow through the two piezoelectric vibrators, output from the current-voltage converter circuit, whereby the voltage amplifier circuit, the piezoelectric vibrators, and the current-voltage converter circuit causes an oscillating operation.

Accordingly, highly sensitive detection of a mechanical force is facilitated based on sharp responses of resonant frequencies to stresses applied to the two piezoelectric vibrators. Furthermore, characteristics of the two piezoelectric vibrators affect operating points of oscillating operations, thereby stabilizing change in oscillating frequency in relation to stresses applied to the two piezoelectric vibrators.

The mechanical force sensor may be such that the voltage amplifier circuit includes a voltage amplitude limiting circuit including a constant current circuit and a current switching circuit, and the voltage amplitude limiting circuit limits a voltage amplitude of the voltage signal commonly applied to the two piezoelectric vibrators. Accordingly, the driving voltage of the piezoelectric vibrators is maintained constant, stabilizing circuit operation and preventing generation of heat by the piezoelectric vibrators.

The mechanical force sensor may be such that a frequency of the oscillating operation is a frequency in a resonant frequency range of the piezoelectric vibrators Since the impedances of the piezoelectric vibrators are low in resonant frequency ranges thereof, large currents that flow into the current-voltage converter circuit to increase the gain, causing a stable oscillating operation This improves sensitivity to change in a signal to be detected in accordance with a mechanical force applied to the sensor.

The mechanical force sensor may be such that the resonant frequency range is a range in which admittance phases of the piezoelectric vibrators are within approximately 0±45 degrees. Accordingly, change in the phase difference between the output voltage signals of the current-voltage converter circuit in accordance with a mechanical force applied becomes more linear, allowing detection of the mechanical force in a larger dynamic range.

The mechanical force sensor may be such that the current-voltage converter circuit includes two differential amplifier circuits for respectively generating current signals in opposite phases with input current signals to cancel out the input current signals and for respectively distributing the current signals in the opposite phases into two, and of the two distributed signals associated with each of the two differential amplifier circuits, first current signals flow through a common impedance element and second current signals flow respectively through different impedance elements, thereby generating voltage signals to be output.

By converting changes in the phase of currents that flow through the two piezoelectric vibrators into changes in voltages by two differential amplifier circuits as such, noise components in phase with each other (drift) are removed.

The mechanical force sensor may be such that at least one of the impedance elements is a resistor. Accordingly, cost is reduced, and voltage signals that are in phase with the currents that flow through the two piezoelectric vibrators are obtained, readily allowing a positive feedback to the piezoelectric vibrators by the voltage amplifier circuit.

In the mechanical force sensor, the differential amplifier circuits may be arranged such that emitters or sources of first and second transistors are connected to each other, a first resistor is connected between a node therebetween and an analog ground, emitters or sources of third and fourth transistors are connected to each other, a second resistor is connected between a node therebetween and the analog ground, bases or gates of the first to fourth transistors are connected to a constant voltage source, collectors or drains of the second and third transistors are connected to each other, a fifth resistor is connected between the collectors or drains and a power supply line, and third and fourth resistors are connected between the collectors or drains of the first and fourth transistors and the power supply line, respectively.

By forming common-base amplifier circuits or common-gate amplifier circuits as described above, input impedances of the amplifier circuits are decreased and input capacitances are reduced, so as to provide voltage amplifier circuits and oscillation circuits having favorable frequency characteristics.

The mechanical force sensor may be such that the phase-difference signal processing circuit is a differential phase difference-voltage converter circuit that receives a differential input of the output voltage signals of the current-voltage converter circuit and that outputs a voltage signal representing a phase difference. Accordingly, noise components in phase with each other are removed, so that a voltage signal in accordance with a mechanical force, having small noise components on the whole, is obtained.

The mechanical force sensor may be such that resistors are connected respectively in series with the two piezoelectric vibrators. Accordingly, sensitivity of detection in response to stresses applied to the piezoelectric vibrators is stabilized, and temperature characteristics are compensated.

The mechanical force may be, for example, an acceleration, an angular acceleration, an angular velocity, or a load.

Other features, elements, characteristics and advantages of the present invention will become more apparent from the following detailed description of preferred embodiments thereof with reference to the attached drawings

DETAILED DESCRIPTION OF PREFERRED EMBODIMENTS

First, the construction of a piezoelectric vibrator included in acceleration sensors according to preferred embodiments of the present invention will be described with reference to FIG. 9 to FIG. 11.

Figure 9:
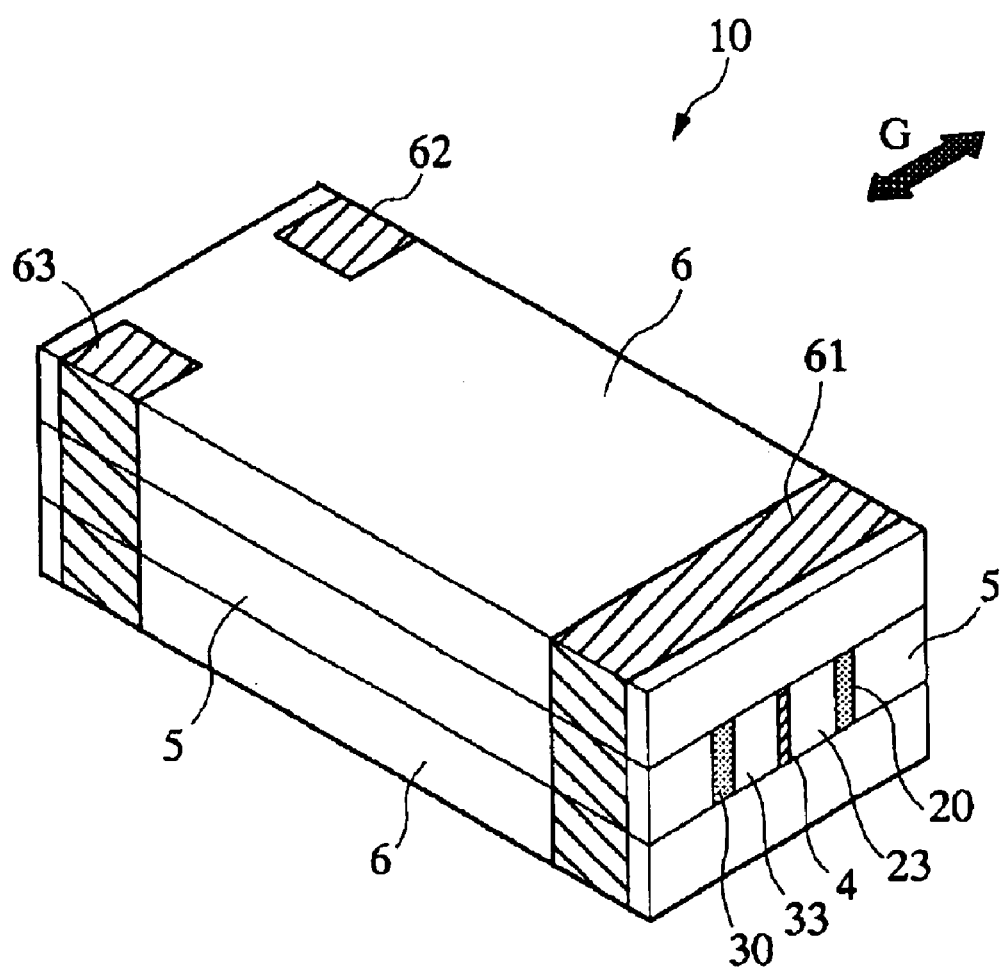
FIG. 9 is an external perspective view of an acceleration-detecting device.
Figure 10:
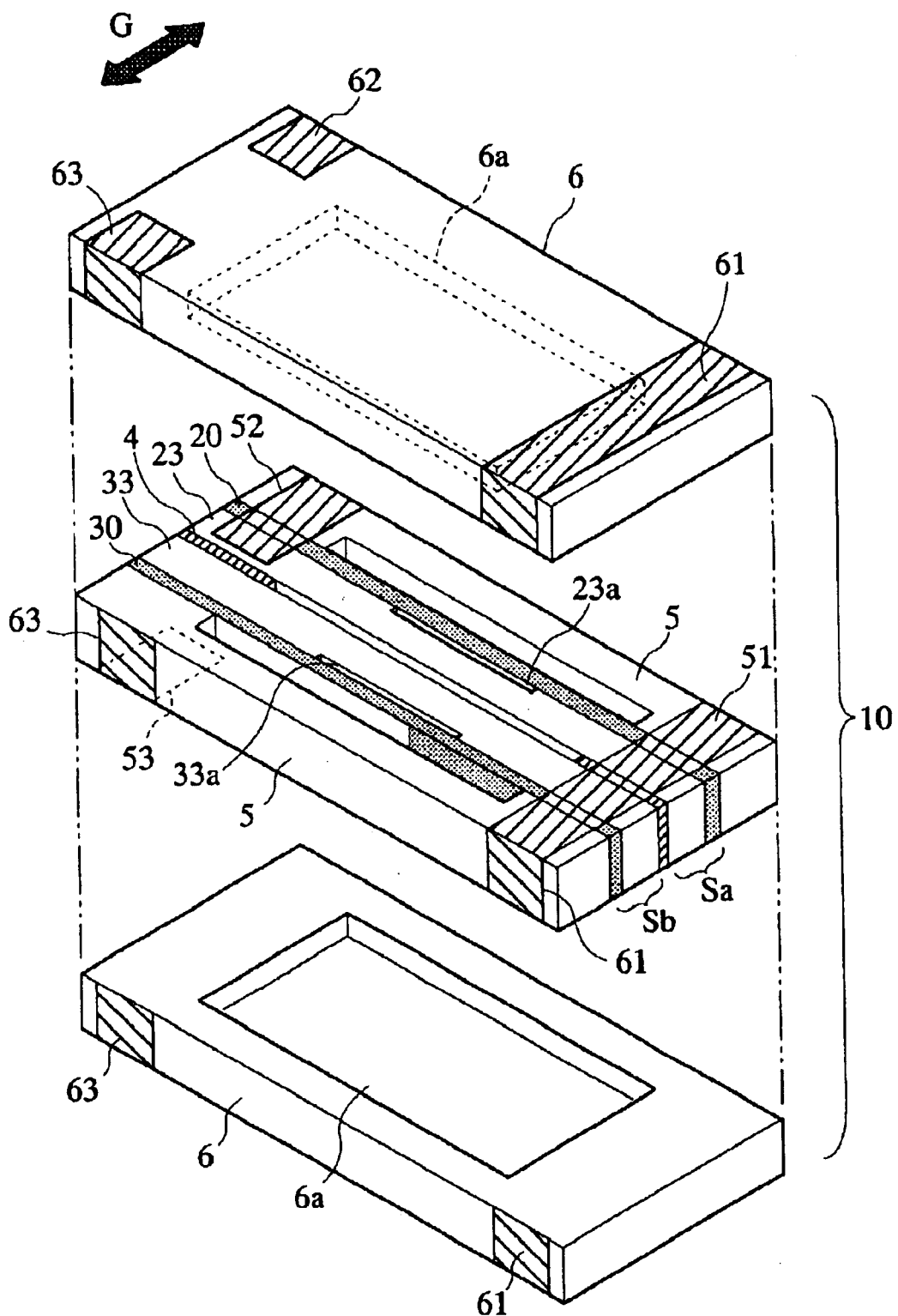
FIG. 10 is an exploded perspective view of the acceleration-detecting device.
Figure 11:
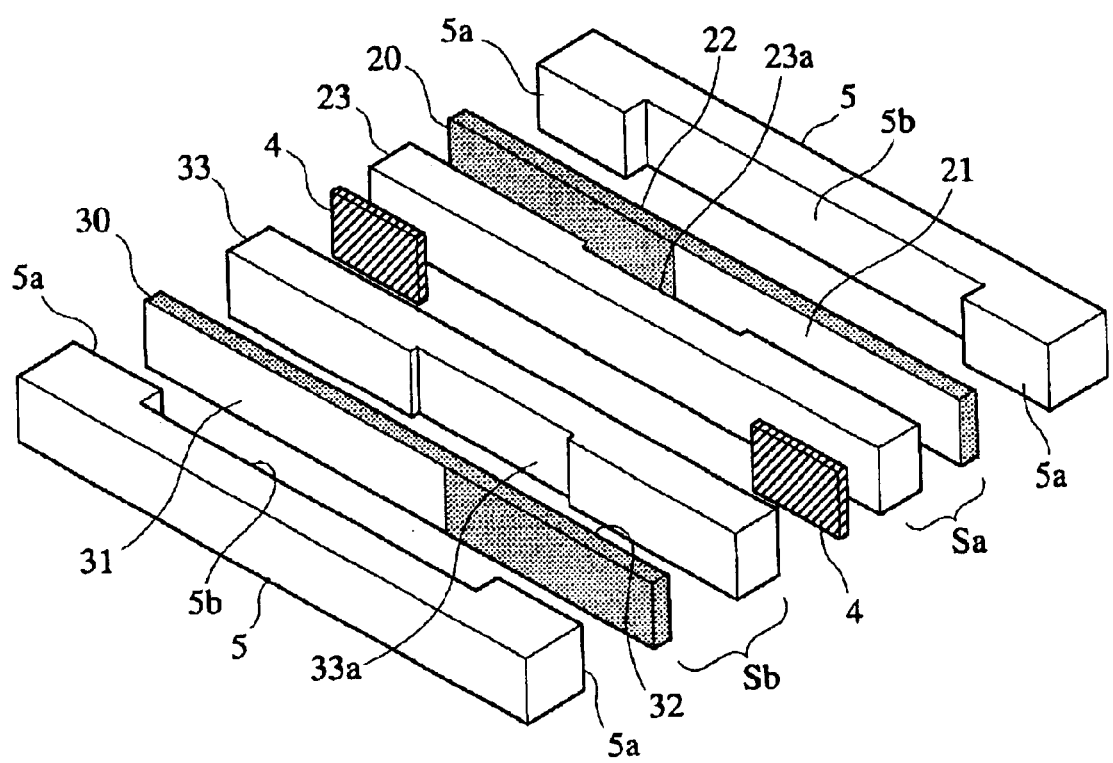
FIG. 11 is an exploded perspective view of main elements of the acceleration-detecting device.

FIG. 9 is an overall perspective view of an acceleration-detecting device, FIG. 10 is an exploded perspective view thereof, and FIG. 11 is a further exploded perspective view of main elements shown in FIG. 10.

The acceleration-detecting device 10 includes two piezoelectric vibrators Sa and Sb supported by a center-impeller beam structure in insulating cases 5 and 6 composed of, for example, an insulating ceramic material. In this example, the piezoelectric vibrators Sa and Sb are preferably unimorph detecting devices. Resonators 20 and 30 implemented by providing electrodes 21 and 22 and 31 and 32 respectively on the top and bottom major surfaces of strip-shaped piezoelectric ceramic plates are joined respectively with surfaces of base plates 23 and 33 for integration therewith, by bonding, soldering, or other suitable connection device or method. The resonators 20 and 30 preferably are both energy-trap type thickness-shear vibration mode resonators, and are polarized in the lengthwise direction of the resonators 20 and 30. The electrodes 21 and 22 and 31 and 32 on the top and bottom surfaces have first ends thereof opposed in central regions of the resonators 20 and 30, and second ends thereof extending to opposite ends of the resonators 20 and 30.

The base plates 23 and 33 are insulating plates preferably having substantially the same length and width as the resonators 20 and 30, and the arrangement is such that the flexural center planes of the piezoelectric vibrators Sa and Sb, associated with the effect of acceleration, are on the sides of the base plates 23 and 33 with respect to the joint surfaces between the resonators 20 and 30 and the base plates 23 and 33. The base plates 23 and 33 are preferably made of a material having a flexural rigidity higher than that of a material for the resonators 20 and 30. The masses of the base plates 23 and 33 are made as large as possible so that the base plates 23 and 33 will function as mass bodies (weights). The surfaces of the base plates 23 and 33 opposing the resonators 20 and 30 have concavities 23a and 33a defining spaces that are larger than ranges of trapped vibration of the resonators 20 and 30 and smaller than ranges of flexure due to acceleration. Thus, trapped vibration of the resonators 20 and 30 is not constrained, and the resonators 20 and 30 and the base plates 23 and 33 are bent together by acceleration.

Both ends of the two piezoelectric vibrators Sa and Sb in the lengthwise direction are opposingly joined via bonding layers 4 defining a spacer layer so that the resonators 20 and 30 will be bent independently in mutually opposite directions and in a direction of application of an acceleration G. The outer surfaces of the piezoelectric vibrators Sa and Sb in the direction of application of the acceleration G are covered by a pair of left and right case members 5. The case members 5 preferably have substantially horseshoe-shaped sections, and protrusions 5a on both ends thereof are bonded and fixed to the outer surfaces of the piezoelectric vibrators Sa and Sb (the exposed surfaces of the resonators 20 and 30) at both ends. Thus, spaces that allow the piezoelectric vibrators Sa and Sb to bend in response to the acceleration G are generated between the case members 5 and the piezoelectric vibrators Sa and Sb by concavities 5b of the case members 5.

Furthermore, the top and bottom open surfaces defined by the piezoelectric vibrators Sa and Sb and the case members 5 are covered by a pair of top and bottom cover members 6. On the inner surfaces of the cover members 6, concavities 6a for avoiding contact with the piezoelectric vibrators Sa and Sb are formed, and peripheral portions thereof are bonded and fixed to the open surfaces. Thus, portions of the piezoelectric vibrators Sa and Sb that are displaced by the acceleration G are completely sealed by the case members 5 and the cover members 6.

Of the electrodes 21 and 22 and 31 and 32 disposed on the resonators 20 and 30, the electrodes 21 and 32 are conductively connected to each other via an inner strip electrode 51 provided on an open surface defined by the piezoelectric vibrators Sa and Sb and the case members 5, and are extended to the outer surfaces of the case members 5. The electrode 22 is extended to the outer surface of the case members 5 via an inner electrode 52 disposed on the top open surface, and the electrode 31 is extended to The opposite outer surface of the case members 5 via an inner electrode 53 disposed on the bottom open surface.

On the outer surfaces of the case members 5 and the cover members 6, outer electrodes 61, 62, and 63 are provided, as shown in FIG. 10, and the inner electrodes 51, 52, and 53 are connected to the outer electrodes 61, 62, and 63, respectively. The surface mount chip acceleration-detecting device 10 is thus provided.

Figure 8A:
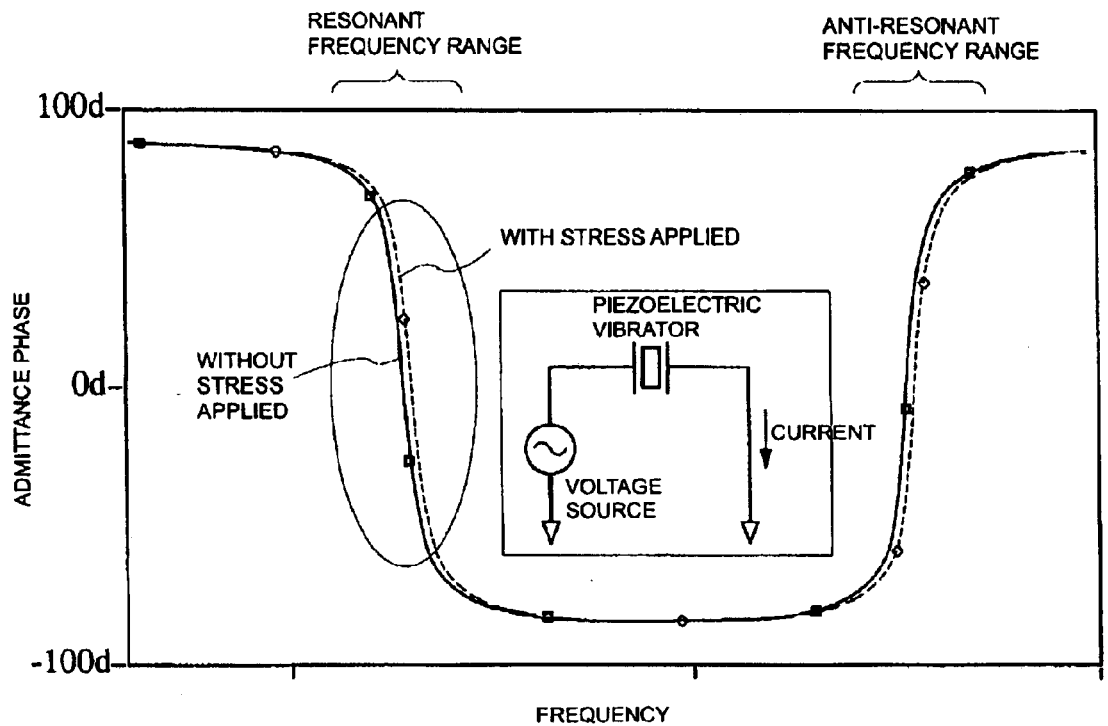
FIGS. 8A and 8B are diagrams showing characteristics of piezoelectric vibrators in the acceleration sensors according to preferred embodiments of the present invention.
Figure 8B:
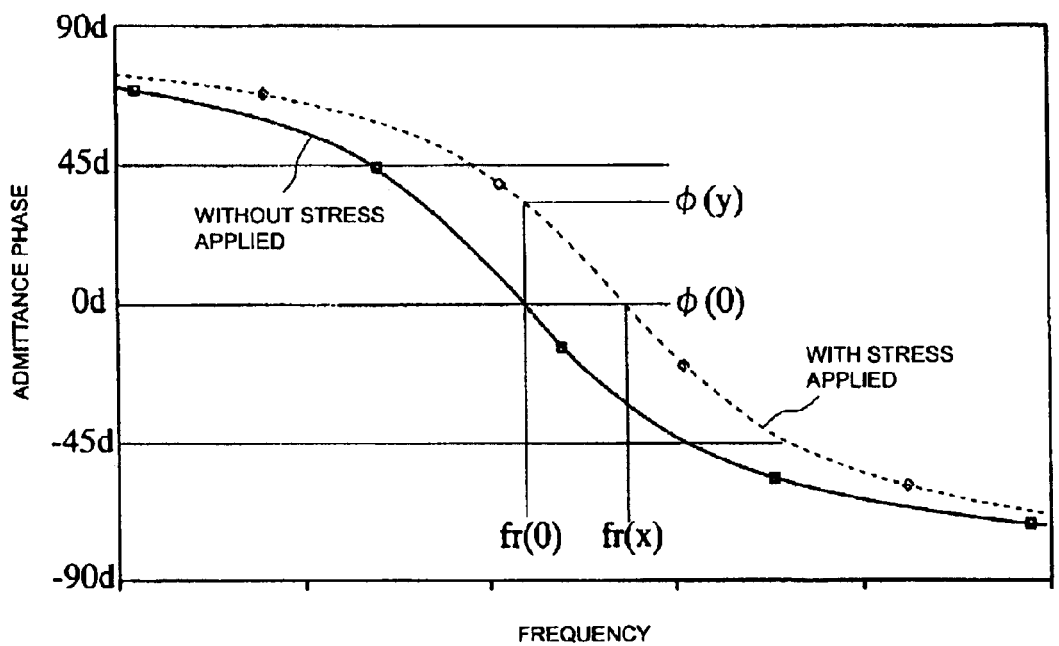

Next, characteristics of the piezoelectric vibrator will be described with reference to FIGS. 8A and 8B. FIG. 8A shows change in the phase of a current caused in a circuit shown in the figure when the frequency of a voltage source is varied (i.e., admittance phase). A solid line represents a state without a stress applied, and a dashed line represents a state with a stress applied. FIG. 8B is an enlarged view of a resonant frequency range in FIG. 8A.

Referring to FIGS. 8A and 8B, a frequency at which the phase becomes 0 degrees is a resonant frequency of the piezoelectric vibrator. As is apparent from FIGS. 8A and 8B, the resonant frequency is changed from fr(0) to fr(x) by application of a stress. It is understood that the phase changes from $\phi(0)$ to $\phi(y)$ by application of a stress if the frequency of the voltage source is fixed to fr(0). Letting the electromechanical force factor of the piezoelectric vibrator be denoted by Qm and the rate of change in the resonant frequency due to stress be denoted by D(fr), $\phi(y)$ can be approximated by equation (1):

$$\phi(y)=(360/\pi)\times Qm\times D(fr) \, [deg] \qquad (1)$$

Now, the configuration of an acceleration sensor according to a first preferred embodiment will be described with reference to FIGS. 1 to 4.

Figure 1:
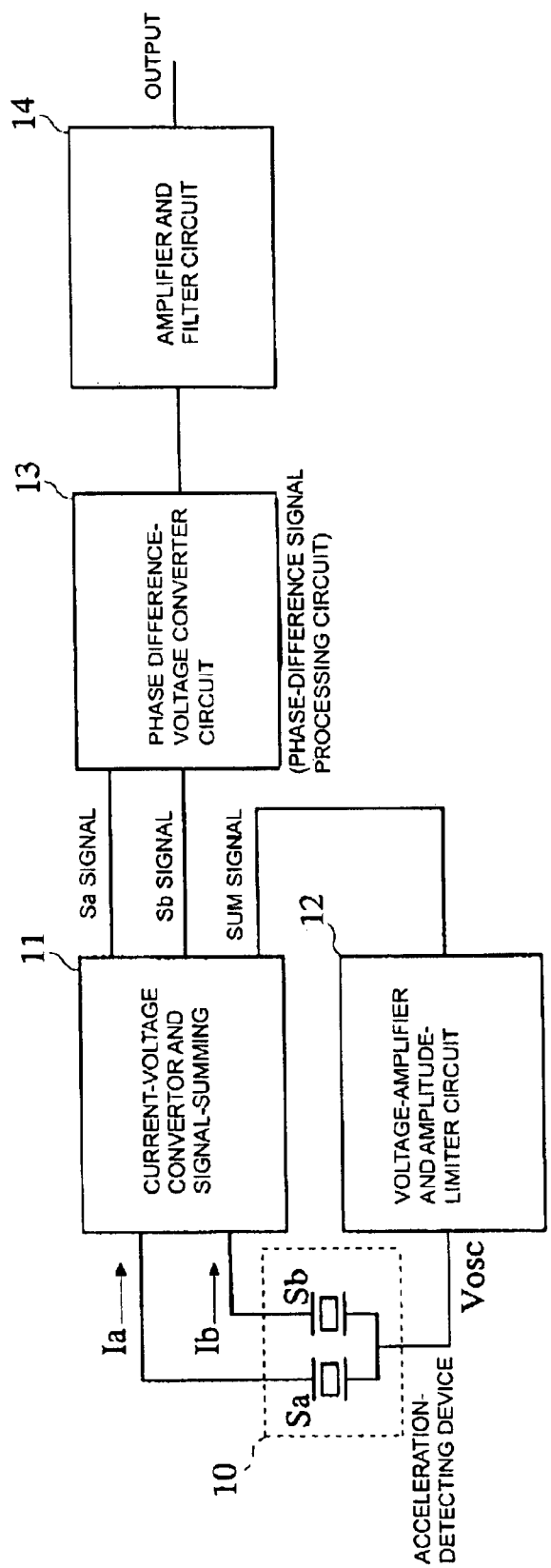
FIG. 1 is a block diagram showing the overall configuration of an acceleration sensor according to a first preferred embodiment of the present invention.

FIG. 1 is a block diagram showing the overall configuration of the acceleration sensor. Referring to FIG. 1, an acceleration-detecting device 10 preferably includes two piezoelectric vibrators Sa and Sb to which stress in mutually opposite directions is applied by an acceleration. A current-voltage converter and signal-summing circuit 11 converts current signals that flow through the two piezoelectric vibrators Sa and Sb of the acceleration-detecting device 10 into voltage signals, outputting an Sa signal and an Sb signal. The current-voltage converter and signal-summing circuit 11 also outputs a sum signal of the Sa signal and the Sb signal.

A voltage-amplifier and amplitude-limiter circuit 12 amplifies the voltage of the sum signal and limits the amplitude thereof, outputting a voltage signal Vosc to the acceleration-detecting device 10. The voltage signal Vosc is applied to a common node between the two piezoelectric vibrators Sa and Sb.

A phase difference-voltage converter circuit 13 corresponds to a "phase-difference signal processing circuit" according to preferred embodiments of the present invention, and it generates a voltage signal that is proportional to the phase difference between the Sa signal and the Sb signal yielded by the conversion into voltage signals.

An amplifier and filter circuit 14 amplifies, by a predetermined gain, the voltage signal obtained by the conversion by the phase difference-voltage converter circuit 13, and removes unwanted frequency components, outputting the result as an acceleration detection signal.

In the circuit shown in FIG. 1, the resonant frequencies of the piezoelectric vibrators Sa and Sb are equalized, and the frequency of the voltage signal Vosc is set to be the resonant frequency fr(0) of the piezoelectric vibrators Sa and Sb, so that an output signal is output from the amplifier and filter circuit 14 when stresses in opposite phases, i.e., compression (tension) and tension (compression), are applied to the piezoelectric vibrators Sa and Sb.

The voltage signal Vosc is a voltage signal of a self-excited oscillation system that loops among the piezoelectric vibrators Sa and Sb, the current-voltage converter and signal-summing circuit 11, and the voltage-amplifier and amplitude-limiter circuit 12.

The frequency of the voltage signal Vosc is not limited to the resonant frequency of the piezoelectric vibrators Sa and Sb, and if it is set to be a frequency at which the frequency-phase characteristics shown in FIG. 8 can be regarded as substantially linear, an acceleration signal can be detected. A frequency at which the admittance phase is within approximately ±45 degrees is practically acceptable. The maximal sensitivity of detecting acceleration is achieved when the frequency of the voltage signal Vosc is matched with the resonant frequency of the piezoelectric vibrators Sa and Sb.

Even if the piezoelectric vibrators Sa and Sb have different resonant frequencies, a practically acceptable sensitivity is achieved by setting the frequency of the voltage signal Vosc so that the admittance phases of the piezoelectric vibrators Sa and Sb are within approximately ±45 degrees Preferably, the frequency of the voltage signal Vosc is set to be a mid frequency between the respective resonant frequencies of the piezoelectric vibrators Sa and Sb Since stresses in opposite phases, i.e., compression (tension) and tension (compression), are applied to the piezoelectric vibrators Sa and Sb, changes in the characteristics of the piezoelectric vibrators Sa and Sb are always in opposite phases, canceling out each other when summed Thus, the characteristics of the sum signal output from the current-voltage converter and signal-summing circuit 11 are always the same regardless of application of an acceleration. Accordingly, the frequency of the voltage signal Vosc does not change even if the characteristics of the piezoelectric vibrators Sa and Sb change due to application of an acceleration.

As shown in FIGS. 8A and 8B, the phase characteristics of a piezoelectric vibrator have two ranges in which the admittance phase is within approximately ±45 degrees (a resonant frequency range and an anti-resonant frequency range). In the anti-resonant frequency range, the impedance of the piezoelectric vibrator is high. Thus, a current that flows into the current-voltage converter and signal-summing circuit 11 is small, so that the gain becomes small and an oscillation is not caused.

On the other hand, in the resonant frequency range, the impedance of the piezoelectric vibrator is low. Thus, a large current flows into the current-voltage converter and signal-summing circuit 11, so that the gain becomes large and a stable oscillation is caused.

In the resonant frequency range, the impedance of the piezoelectric vibrator and the input impedance of the current-voltage converter and signal-summing circuit 11 are both low, and matching can be readily achieved. Thus, C/N ratio can be readily improved.

Figure 2:
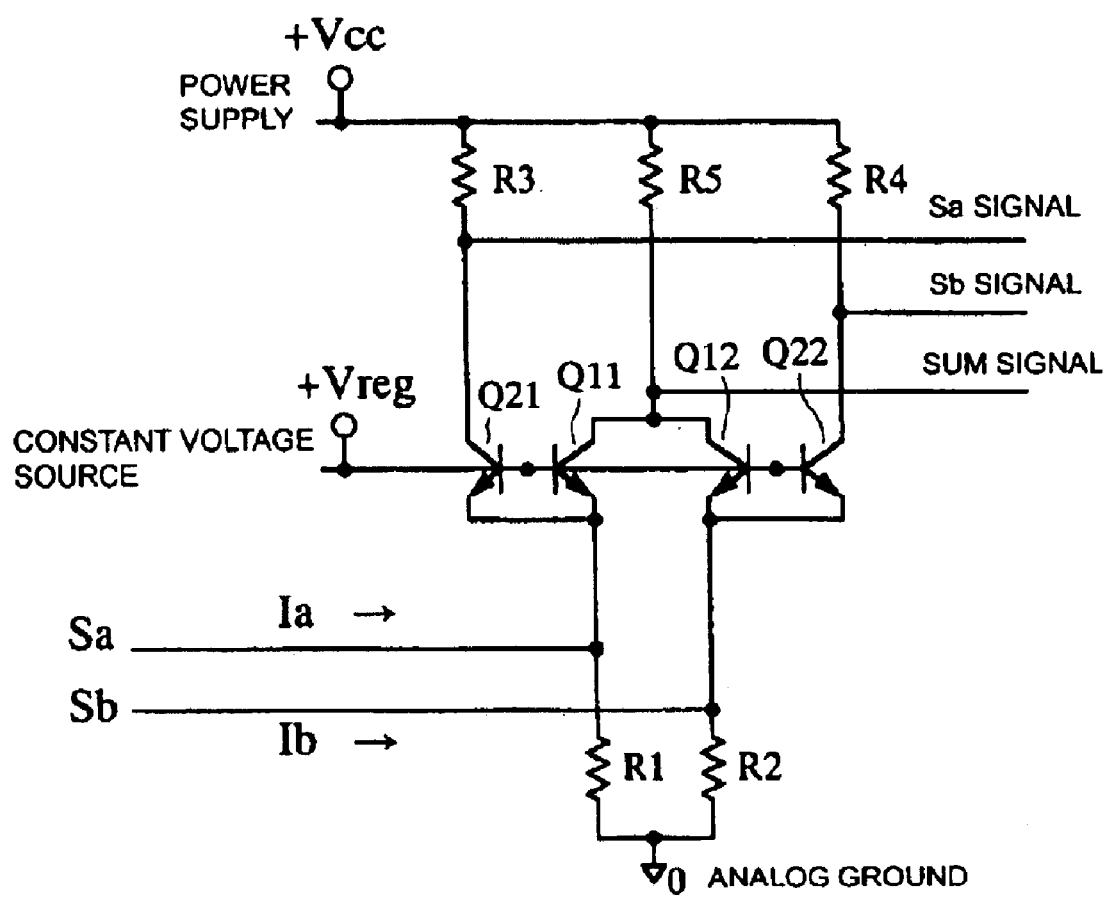
FIG. 2 is a diagram showing the circuit configuration of a current-voltage converter and signal-summing circuit in the acceleration sensor.

FIG. 2 is a circuit diagram of the current-voltage converter and signal-summing circuit 11 shown in FIG. 1. The circuit includes four transistors Q11, Q12, Q21, and Q22, and five resistors R1 to R5. As shown in FIG. 2, the emitters of the transistors Q11 and Q21 are connected to each other, and the resistor R1 is connected between a node between the emitters and an analog ground. Also, the emitters of the transistors Q12 and Q22 are connected to each other, and the resistor R2 is connected between a node between the emitters and the analog ground. All the bases of the resistors Q11, Q12, Q21, and Q22 are connected to a constant voltage source Vreg. The collectors of the transistors Q11 and Q12 are connected to each other, and the resistor R5 is connected between a node between the collectors and a power supply Vcc. The resistors R3 and R4 are connected between collectors of the transistors Q21 and Q22 and the power supply, respectively.

The transistors Q11, Q12, Q21, and Q22 preferably have the same characteristics. The resistors R1 and R2 have the same resistance, and the resistors R3 and R4 have the same resistance. Furthermore, the resistors R1 to R5 have the same temperature characteristics.

The current-voltage converter and signal-summing circuit 11 is a common-base amplifier circuit. That is, when a current Ia enters the node between the emitters of the transistors Q11 and Q21 and the resistor R1 via the piezoelectric vibrator Sa, currents flow from the transistors Q11 and Q21 so as to cancel out the current Ia. Similarly, when a current Ib enters the node between the emitters of the transistors Q12 and Q22 and the resistor R2 via the piezoelectric vibrator Sb, currents flow from the transistors Q12 and Q22 so as to cancel out the current Ib Thus, the input impedances of the amplifier circuit as viewed from the piezoelectric vibrators Sa and Sb are extremely low.

Since the transistors Q11 and Q21 have the same characteristics and the bases thereof are at the same potential, the same amount of current flows into each of the collectors of the transistors Q11 and Q21. Similarly, since the transistors Q12 and Q22 have the same characteristics and the bases thereof are at the same potential, the same amount of current flows into each of the collectors of the transistors Q12 and Q22.

Since the transistors Q11, Q12, Q21, and Q22 have the same characteristics, the bases thereof are at the same potential, and R1=R2, the input impedances as viewed from the piezoelectric vibrators Sa and Sb are equal. Letting the input impedance be denoted by Zin, Zin can be expressed by the following equation:

$$Zin=1/\{(1/R1)+(1+hfe)/hie\}\times\frac{1}{2} \quad (2)$$

where Ri=R1=R2, hfe denotes an amplification factor for a small current signal in the case of common emitter, and hie denotes an input impedance between the base and the emitter in the case of common emitter.

Assuming that hfe=300, hie=1 k$\Omega$, and Ri=100 $\Omega$, the input impedance Zin is about 1.6 $\Omega$, which is extremely low. Since the input impedance is extremely low as described above, the following advantages are achieved:

(1) Non-susceptibility to effects of variations in electrostatic capacitance at the input of the current-voltage converter and signal-summing circuit 11.

(2) Non-susceptibility to the effects of stray capacitance caused on a circuit board, etc defining the current-voltage converter and signal-summing circuit 11.

(3) Due to the advantages (1) and (2), the phases of the current signals Ia and Ib input to the current-voltage converter and signal-summing circuit do not change even if a resistance component and/or an inductance component is present in the wiring between the acceleration-detecting device 10 and the current-voltage converter and signal-summing circuit 11.

Thus, even if the acceleration-detecting device 10 and the current-voltage converter and signal-summing circuit 11 are disposed at a distance from each other, the effect is extremely small.

Although the input impedance Zin is preferably about 1.6 $\Omega$ in this preferred embodiment, the input impedance Zin is not limited thereto. For example, if it is aimed to separate the acceleration-detecting device 10 and the current-voltage converter and signal-summing circuit 11 by a distance on the order of several ten cm, the input impedance Zin may be on the order of several hundred Ω if the oscillating frequency is several MHz (an oscillating operation will be described later). That is, to which extent the input impedance is lowered is determined as appropriate in consideration of the distance between the acceleration-detecting device 10 and the current-voltage converter and signal-summing circuit 11 and of installation environment.

The output levels (amplitudes) of the Sa signal, the Sb signal, and the sum signal output from the current-voltage converter and signal-summing circuit 11 can be expressed respectively by the following equations, where Ia and Ib denote currents input via the piezoelectric vibrators Sa and Sb:

$$\text{Level of the Sa signal} = R3 \times Ia/2 \quad (3)$$

$$\text{Level of the Sb signal} = R4 \times Ib/2 \quad (4)$$

$$\text{Level of the sum signal} = R5 \times (Ia+Ib)/2 \quad (5)$$

In order to equalize the output levels of the three signals, the resistance ratio among the resistors R3, R4, and R5 is preferably approximately 2:2:1. It is understood from equations (3) and (4) that this circuit operates as a current-voltage converter that converts currents Ia and Ib flowing through the piezoelectric vibrators Sa and Sb into voltage signals. Also, it is understood from equation (5) that the circuit operates as a signal-summing circuit that sums the currents Ia and Ib flowing through the piezoelectric vibrators Sa and Sb and converts the result into a voltage signal.

The current signals Ia and Ib can be expressed by the following equations:

$$Ia = Vosc/Z(Sa) \quad (6)$$

$$Ib = Vosc/Z(Sb) \quad (7)$$

where Z(Sa) denotes an impedance of the piezoelectric vibrator Sa at the oscillating frequency, Z(Sb) denotes an impedance of the piezoelectric vibrator Sb at the oscillating frequency, and Vosc denotes an output voltage from the voltage-amplifier and amplitude-limiter circuit 12.

The sensitivity of the acceleration sensor to acceleration becomes highest when the sum (Ia+Ib) of the currents Ia and Ib flowing through the piezoelectric vibrators Sa and Sb is in phase with the output voltage Vosc of the voltage-amplifier and amplitude-limiter circuit 12. In the circuit disclosed in Japanese Unexamined Patent Application Publication No. 2002-243757, described earlier, an optimal point must be set by a phase-shit circuit. According to this preferred embodiment, current signals that flow through the two piezoelectric vibrators Sa and Sb are used, eliminating the need for the phase-shift circuit. It suffices to arrange the current-voltage converter and signal-summing circuit 11 and the voltage-amplifier and amplitude-limiter circuit 12 so that the sum signal will be in phase with the voltage signal Vosc in total.

Since the current-voltage converter and signal-summing circuit 11 is implemented by a common-base amplifier circuit as shown in FIG. 2, the sum (Ia+Ib) of the currents Ia and Ib that flow through the piezoelectric vibrators Sa and Sb are in phase with the voltage of the sum signal. Also, the voltage-amplifier and amplitude-limiter circuit 12 is arranged so that the input sum signal is in phase with the output voltage Vosc. Thus, the phase shift in the two circuits in total is zero (in phase).

Although bipolar transistors are preferably used in the example shown in FIG. 2, FETs (field-effect transistors) may be used for implementation. In that case, the gates, sources, and drains of the FETs correspond to the bases, emitters, and collectors of the bipolar transistors, respectively.

The number of transistors is not limited to four, and transistors may be connected in parallel to the transistors Q11, Q12, Q21, and Q22, for example, in order to lower the input impedance.

Furthermore, the amplifier circuit is not limited to common-base type. In essence, the arrangement of the circuit is such that current signals in opposite phases with input current signals are generated to cancel out the input current signals, thereby lowering the input impedance, circuits for respectively dividing the opposite-phase current signals into two are provided, and of the two distributed current signals associated with each of the circuits, first current signals flow through a common impedance element, generating a current-voltage conversion signal (Ia+Ib), and second current signals respectively flow through different impedance elements, generating current voltage conversion signals Ia and Ib, respectively.

By using the resistors R1 to R5 as impedance elements as shown in FIG. 2, overall cost is reduced, and a voltage signal in phase with the Ia, Ib, and (Ia+Ib) signals can be readily yielded. This advantage is not limited to a common-base amplifier circuit.

As described above, two piezoelectric vibrators to which stresses in mutually opposite directions are applied by a mechanical force, a circuit for applying a voltage signal commonly to the two piezoelectric vibrators, a current-voltage converter circuit for converting current signals that flow through the two piezoelectric vibrators into voltage signals, and a phase-difference signal processing circuit for detecting a phase difference between the output voltage signals of the current-voltage converter circuit and outputting a mechanical force detection signal are provided. Thus, the negative effects of a measurement environment are minimized, and stable measurement of a mechanical force is facilitated. Accordingly, the circuit portion need not be adjusted.

Furthermore, in the current-voltage converter circuit, changes in the phases of currents that flow through the two piezoelectric vibrators are converted into change in a voltage by two differential amplifier circuits, whereby a noise component in phase with each other (drift) is removed.

Furthermore, since the differential amplifier circuits are implemented by common-base amplifier circuits or common-gate amplifier circuits, the input impedance and input capacitance of the amplifier circuits are small. Thus, a voltage amplifier circuit and an oscillation circuit having favorable frequency characteristics are provided.

With these operations, the piezoelectric vibrators that receive a mechanical force to be detected can be separated from the piezoelectric vibrators, allowing applications to various purposes.

Figure 3:
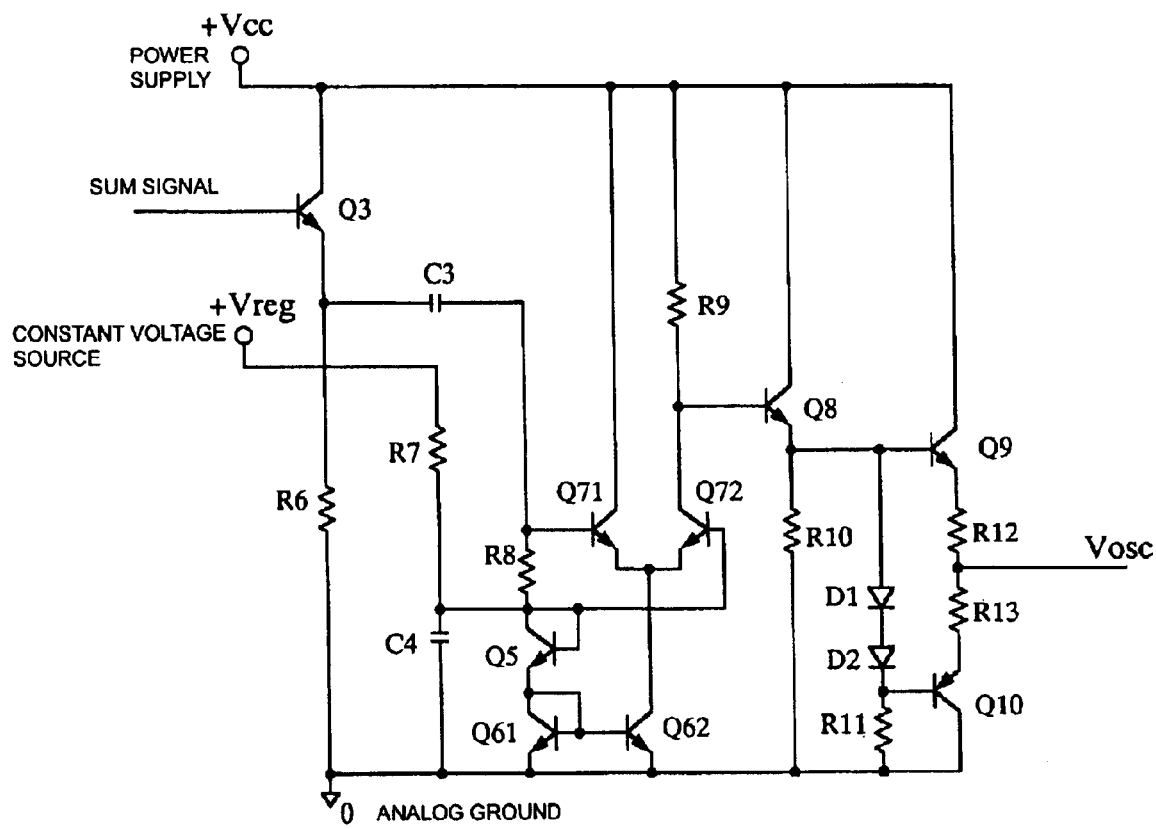
FIG. 3 is a diagram showing the circuit configuration of a voltage-amplifier and amplitude-limiter circuit in the acceleration sensor.

FIG. 3 is a circuit diagram of the voltage-amplifier and amplitude-limiter circuit 12 shown in FIG. 1. The circuit amplifies the sum signal voltage output from The current-voltage converter and signal-summing circuit 11 shown in FIG. 1, converts the result into a rectangular wave having an amplitude that may be arbitrarily determined, and performs impedance conversion, thereby applying a voltage signal Vosc to a common terminal of the piezoelectric vibrators Sa and Sb.

Referring to FIG. 3, a transistor Q3 and a resistor R6 define a voltage-follower circuit. According to this arrangement, the sum signal is received at high input impedance. The output of the voltage-follower circuit is input to the base of a transistor Q71 via a capacitor C3.

Transistors Q5, Q61, Q62, Q71, Q72, Q8, and resistors R7 to R10 define an ECL (emitter coupled logic) circuit. The transistors Q71 and Q72 define a current switch. That is, one of the two transistors Q71 and Q72 with a lower base potential is turned OFF, and the other transistor with a higher base potential is turned ON and a current flows into the collector. The current that flows through the current switch is controlled by a constant current circuit defined by a constant voltage source Vreg, the resistor R7, and the transistors Q5, Q61, and Q62. The transistors Q61 and Q62 define a current mirror circuit, and the same amount of current flows through the transistor Q62 as that flows through the transistor Q61. The value Is of the current that flows through the transistor Q62 can be expressed by the following equation:

$$Is = (Vreg - 2 \times Vbe)/R7 \tag{8}$$

where Vreg denotes a voltage of the constant voltage source, and Vbe denotes a base-emitter voltage of the transistors Q5 and Q61.

Thus, at a node between the transistor Q72 and the resistor R9, a rectangular wave having an amplitude (peak-to-peak value) expressed by the following equation is generated:

$$A = Is \times R9 \tag{9}$$

From equations (8) and (9), the amplitude of the rectangular wave can be controlled to any value by the resistor R7 or the voltage Vreg.

Referring to FIG. 3, the transistor Q8 and the resistor R10 define a voltage-follower circuit. The voltage-follower circuit operates so as to lower the impedance of a signal output from the node between the transistor Q72 and the resistor R9, supplying the result to a next stage.

The transistors Q9 and Q10, diodes D1 and D2, and resistors R11, R12, and R13 define a push-pull voltage-follower circuit. The voltage-follower circuit is provided in order to further lower the output impedance of the transistor Q8. The resistors R12 and R13 are provided for protection of the transistors Q9 and Q10.

As described above, the voltage signal Vosc output from the voltage-amplifier and amplitude-limiter circuit 12 is a signal yielded by converting the sum signal voltage from the current-voltage converter and signal-summing circuit 11 into a rectangular wave having an amplitude that may be arbitrarily determined and lowering the impedance of the rectangular wave.

As described above, a voltage amplitude limiter circuit including a constant current circuit and a current switching circuit is provided in a voltage amplifier circuit, and the voltage amplitude limiter circuit limits the amplitude of a driving voltage commonly applied to two piezoelectric vibrators. Accordingly, circuit operation is stabilized and heat generation by the piezoelectric vibrators is minimized.

Figure 4:
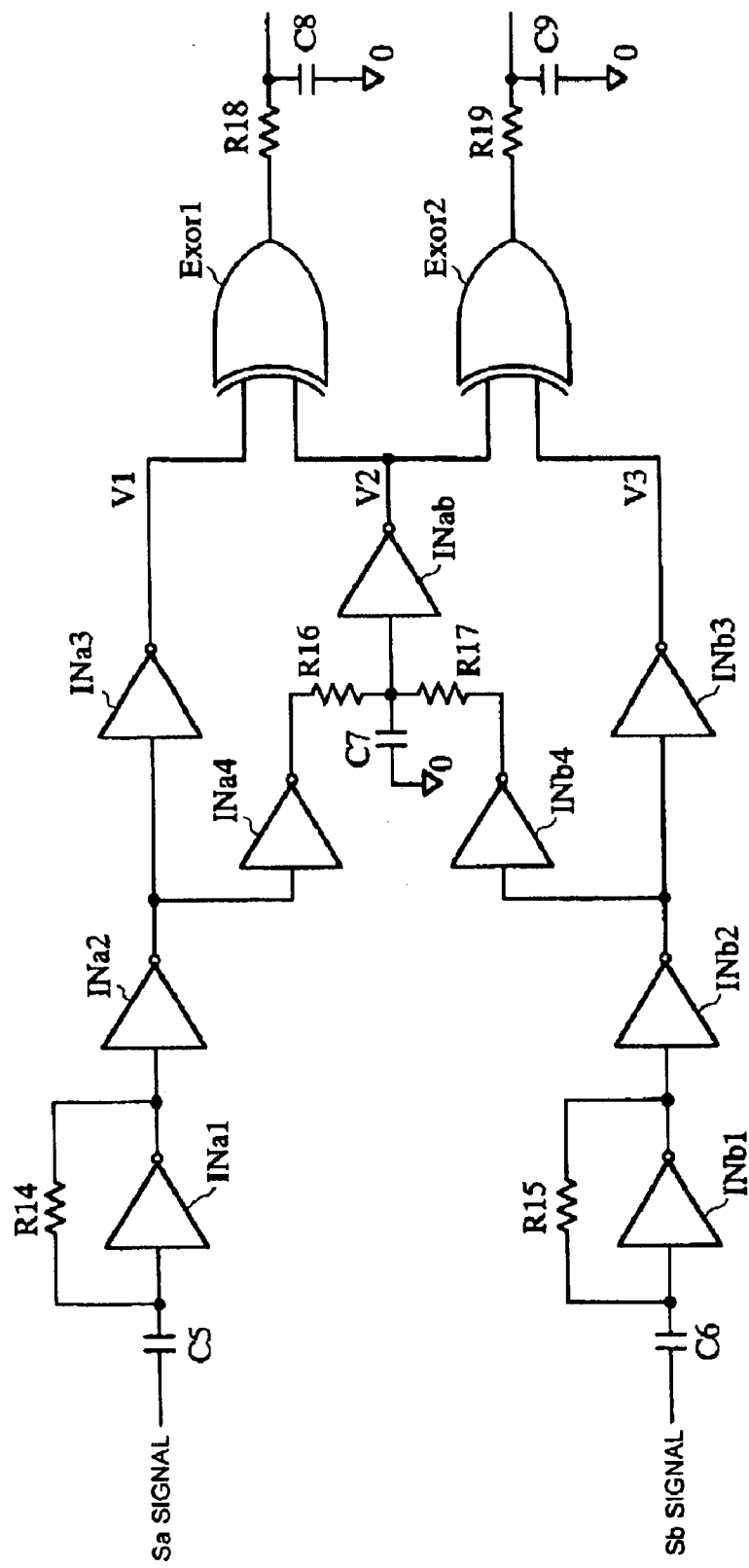
FIG. 4 is a diagram showing the circuit configuration of a phase difference-voltage converter circuit in the acceleration sensor.

FIG. 4 is a circuit diagram of the phase-difference voltage converter circuit 13 shown in FIG. 1. Referring to FIG. 4, the phase-difference voltage converter circuit 13 includes inverters (NOT gates) INa1 to Ina4, INb1 to INb4, and INab, and exclusive-OR gates Exor1 and Exor2.

The inverter INa1 and a resistor R14 define an amplifier circuit having a predetermined gain. A capacitor C5 removes a DC component. The inverters INa2 and INa3 define a waveform-shaping circuit. Thus, the Sa signal is waveform-shaped to supply a signal V1 to one of the inputs of the exclusive-OR gate Exor1. Similarly, the three inverters INb1, INb2, IINb3, R15, and C6 waveform-shape the Sb signal to supply a signal V3 to one of the inputs of the exclusive-OR gate Exor2.

Resistors R16 and R17 and a capacitor C7 define a circuit for summing and integrating two signals, and it sums and integrates the Sa signal and the Sb signal in cooperation with the inverters INa4, INb4, and INab to yield a signal V2 having a phase shifted by 90°. The signal V2 is supplied to each of the other inputs of the two exclusive-OR gates Exor1 and Exor2.

Furthermore, smoothing circuits defined by resistors R18 and R19 and capacitors C8 and C9 are connected respectively to the outputs of the two exclusive-OR gates, so that a differential voltage signal that is substantially proportional to the phase difference between the Sa signal and the Sb signal is output.

The amplifier and filter circuit 14 shown in FIG. 1 analog-amplifies, by a differential amplifier circuit, the differential signal yielded by converting the phase difference into a voltage signal, and removes frequency components other than frequency components to be detected.

As described above, current signals that flow through two piezoelectric vibrators are converted into voltage signals, and a voltage signal proportional to the phase difference between the voltage signals is output as a mechanical force detection signal.

Next, the configuration of an acceleration sensor according to a second preferred embodiment will be described with reference to FIGS. 5 and 6.

Figure 5:
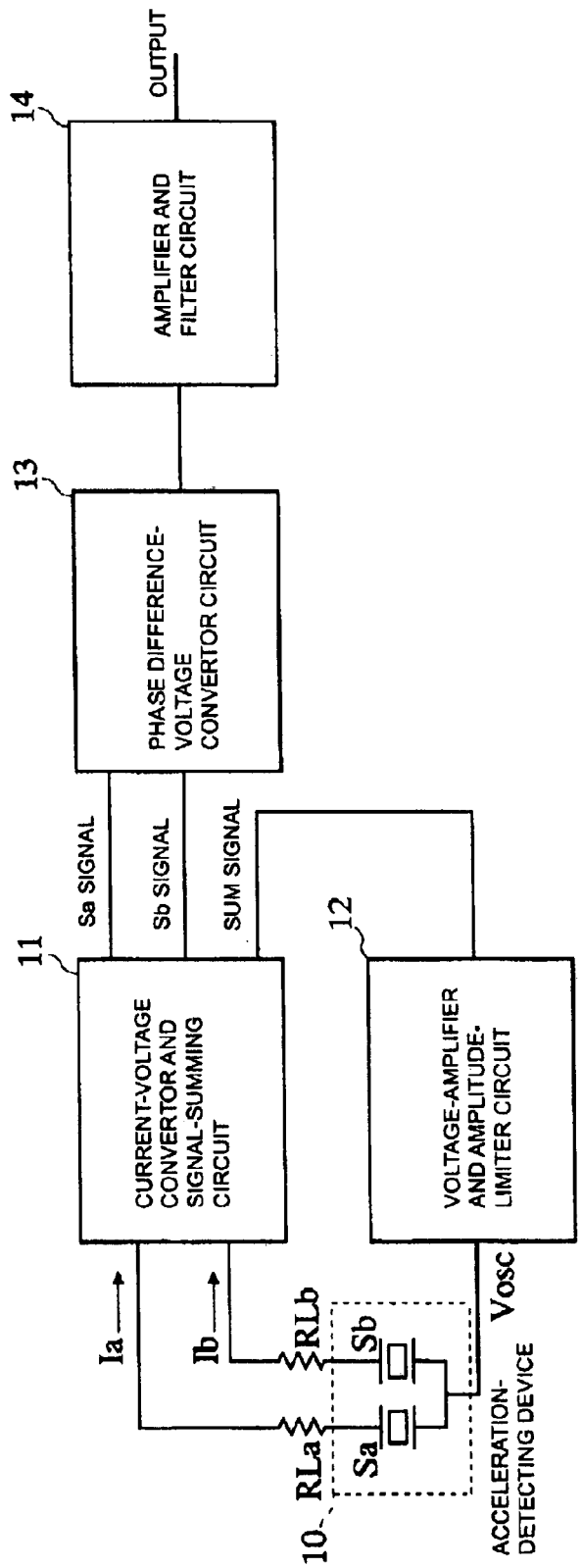
FIG. 5 is a block diagram showing the overall configuration of an acceleration sensor according to a second preferred embodiment of the present invention.

FIG. 5 is a block diagram showing the overall configuration of the acceleration sensor according to the second preferred embodiment of the present invention. This acceleration sensor is different from the acceleration sensor shown in FIG. 1 in that resistors RLa and RLb are connected respectively to the piezoelectric vibrators Sa and Sb in series, and is otherwise the same as the acceleration sensor according to the first preferred embodiment of the present invention.

Figure 6:
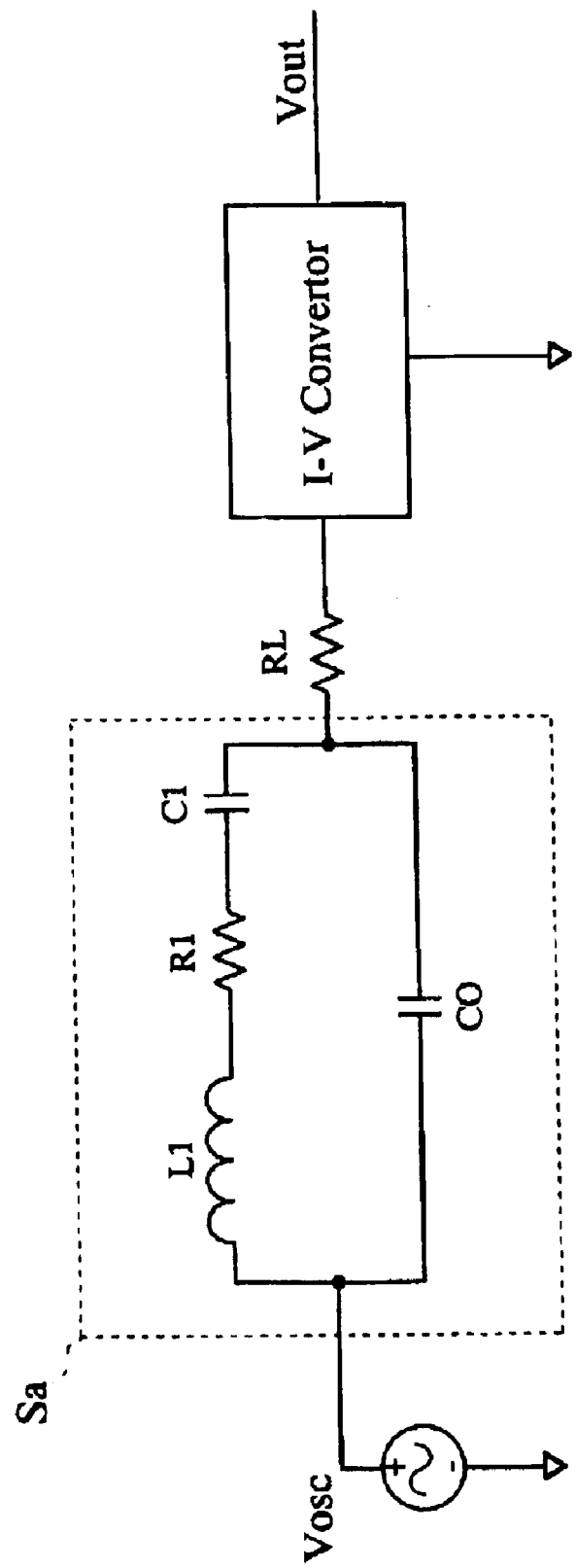
FIG. 6 is an equivalent circuit diagram of main elements of the acceleration sensor.

FIG. 6 is an equivalent circuit diagram for explaining the effect of a resistor connected in series with a piezoelectric vibrator. Since the effect of a resistor connected in series with the piezoelectric vibrator is common between the two piezoelectric vibrators Sa and Sb, FIG. 6 only deals with the piezoelectric vibrator Sa. In FIG. 6, Sa denotes an equivalent circuit of the piezoelectric vibrator Sa, Vosc denotes a voltage signal output from the voltage-amplifier and amplitude-limiter circuit 12 shown in FIG. 5, and RL denotes a resistor connected in series with the piezoelectric vibrator Sa. An I-V converter is a current-voltage converter circuit implemented by the current-voltage converter and signal-summing circuit 11 shown in FIG. 5.

The voltage phase $\phi$ of an output voltage Vout of the current-voltage converter circuit is obtained, the voltage phase $\phi$ is partially differentiated with respect to an angular frequency $\omega$, and an oscillation angular frequency $\omega o$ is assigned to the equation obtained, thereby calculating the gradient (differential coefficient) $\Delta\phi$ of the voltage phase $\phi$. $\Delta\phi$, which is expressed by a very complex equation, can be approximated by the following equation:

$$\Delta\phi = -2 \times L1/(R1 + RL) \tag{10}$$

The change in phase is represented by a value obtained by multiplying $\Delta\phi$ with a difference between the oscillation angular frequency $\omega o$ and the resonant angular frequency or of the piezoelectric vibrator. When acceleration is not being exerted on the acceleration-detecting device 10, $\omega o = \omega r$.

That is, $\Delta\phi$ is one of the factors that determine sensitivity of detecting acceleration. The sensitivity of detecting acceleration can be compensated if $\Delta\phi$ can be controlled.

Now, a method of temperature compensation will be considered.

The result of a partial differentiation of equation (10) with respect to temperature T is expressed by the following equation:

Eq. 11

$$\frac{\partial}{\partial T}(\Delta\phi) = \frac{-2 \times L1}{R1+RL}\left(\frac{\partial L1}{\partial T}\frac{1}{L1} - \frac{\partial R1}{\partial T}\frac{1}{R1} \times \frac{R1}{R1+RL} - \frac{\partial RL}{\partial T}\frac{1}{RL} \times \frac{RL}{R1+RL}\right) \quad (11)$$

Equation (11) can be rearranged into the following equation:

$$\Delta\phi tc = L1tc - \{1/(R1+RL)\} \times (R1tc \times R1 + RLtc \times RL) \quad (12)$$

where $\Delta\phi tc$, $L1tc$, and $RLtc$ denote temperature coefficients of $\Delta\phi$, $L1$, and $RL$, respectively.

The phase gradient $\Delta\phi$ can be temperature-compensated if a condition for setting the right-hand side of equation (12) can be selected. If a resistor (such as an oxide film resistor) whose temperature coefficient can be regarded substantially as zero is used, solving equation (12) for RL with RLtc=0 and the condition for temperature compensation $\Delta\phi tc=0$ yields the following equation:

$$RL = R1 \times (R1tc/L1tc - 1) \quad (13)$$

When an ordinary piezoelectric ceramic vibrator is used, and RL=R1, the range of the rate of change in the sensitivity of detecting acceleration in the entire operating temperature range (−40° C. to 85° C.) is reduced to approximately one half.

In this example, in order to reduce cost, a general-purpose surface mount fixed resistor whose temperature coefficient is substantially zero, such as an oxide film resistor, is used Alternatively, a resistor having a temperature gradient, such as a thermistor, may be used. A condition that sets $\Delta\phi tc=0$ in equation (12) is selected accordingly.

If the input impedance of the I-V converter shown in FIG. 6 cannot be neglected as compared with RL, calculation is done in consideration of the input impedance of the I-V converter together with RL.

As described above, by using only two general-purpose surface-mount fixed resistors, the rate of change in the sensitivity of detecting acceleration in the entire operating temperature range is significantly improved without increasing cost. This advantage is achieved by using current signals that flow through an acceleration-detecting device, and is not achieved by the configuration disclosed in Japanese Unexamined Patent Application Publication No. 2002-243757.

Although acceleration sensors that detect the difference between stresses applied to the two piezoelectric vibrators Sa and Sb by acceleration are used in the first and second preferred embodiments, sensors that detect other mechanical forces can be similarly constructed by arranging so that stresses in opposite directions will be applied to the piezoelectric vibrators Sa and Sb by the mechanical forces For example, if the arrangement is such that a difference in stress is caused between the two piezoelectric vibrators Sa and Sb by an angular acceleration, the arrangement can be used as an angular acceleration sensor. If the arrangement is such that a difference in stress is caused between the two piezoelectric vibrators Sa and Sb by an angular velocity, the arrangement can be used as an angular velocity sensor. Similarly, if the arrangement is such that a difference in stress is caused between the two piezoelectric vibrators Sa and Sb by a load, the arrangement can be used as a load sensor.

Next, the configuration of an acceleration sensor according to a third preferred embodiment will be described with reference to FIG. 7.

Figure 7:
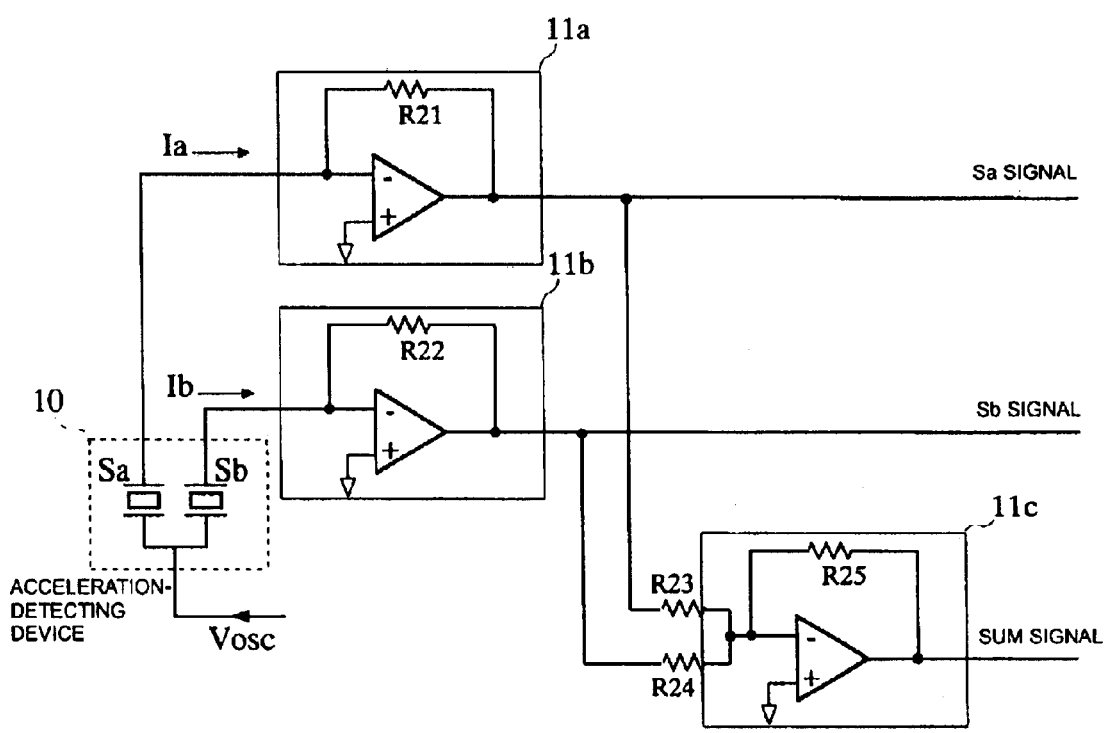
FIG. 7 is a diagram showing the configuration of a current-voltage converter and signal-summing circuit in an acceleration sensor according to a third preferred embodiment of the present invention.

FIG. 7 is a diagram showing the configuration of a current-voltage converter and signal-summing circuit that is different from the current-voltage converter and signal-summing circuit included in the acceleration sensors according to the first and second preferred embodiments. As opposed to the first and second preferred embodiments, in which summing is performed at the stage of current signals, in the example shown in FIG. 7, summing is performed after conversion into voltage signals. Referring to FIG. 7, an acceleration-detecting device 10 includes two piezoelectric vibrators Sa and Sb to which stresses in mutually opposite directions are applied by an acceleration. Also provided are current-voltage converter circuits 11a and 11b, and a summing circuit 11c for voltage signals.

The current-voltage converter circuits 11a and 11b are defined by operational amplifiers and feedback resistors R21 and R22, respectively. The summing circuit 11c is defined by an operational amplifier and resistors R23, R24, and R25.

In the example shown in FIG. 7, however, a high-speed operational amplifier that exhibits a predetermined gain even at an oscillation frequency (frequency of the voltage signal Vosc) of several MHz is required As opposed thereto, in the example shown in FIG. 2, the only active elements used are the four transistors, achieving an advantage of lower cost.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. A mechanical force sensor comprising:
   at least two piezoelectric vibrators to which stresses in mutually opposite directions are applied by a mechanical force;
   a circuit for applying a voltage signal commonly to the at least two piezoelectric vibrators;
   a current-voltage converter circuit for converting current signals that flow through the at least two piezoelectric vibrators into voltage signals; and
   a phase-difference signal processing circuit for detecting a phase difference between the output voltage signals of the current-voltage converter circuit and outputting a mechanical force detection signal.

2. A mechanical force sensor according to claim 1, wherein the circuit for applying a voltage signal commonly to the at least two piezoelectric vibrators is a voltage amplifier circuit that provides the at least two piezoelectric vibrators with a positive feedback of a voltage signal from and in phase with a voltage signal obtained by summing the current signals that flow through the at least two piezoelectric vibrators, output from the current-voltage converter circuit, whereby the voltage amplifier circuit, the piezoelectric vibrators, and the current-voltage converter circuit cause an oscillating operation.

3. A mechanical force sensor according to claim 2, wherein the voltage amplifier circuit includes a voltage amplitude limiting circuit including a constant current circuit and a current switching circuit, and the voltage amplitude limiting circuit limits a voltage amplitude of the voltage signal commonly applied to the at least two piezoelectric vibrators.

4. A mechanical force sensor according to claim 2, wherein a frequency of the oscillating operation is a frequency in a resonant frequency range of the piezoelectric vibrators.

5. A mechanical force sensor according to claim 4, wherein the resonant frequency range is a range in which admittance phases of the piezoelectric vibrators are within approximately 0±45 degrees.

6. A mechanical force sensor according to claim 1, wherein the current-voltage converter circuit includes two differential amplifier circuits for respectively generating current signals in opposite phases with input current signals to cancel out the input current signals and for respectively dividing the current signals in the opposite phases into two, and of the two distributed signals associated with each of the two differential amplifier circuits, first current signals flow through a common impedance element and second current signals flow respectively through different impedance elements, thereby generating voltage signals to be output.

7. A mechanical force sensor according to claim 6, wherein at least one of the impedance elements is a resistor.

8. A mechanical force sensor according to claim 6, wherein the differential amplifier circuits are arranged such that emitters or sources of first and second transistors are connected to each other, a first resistor is connected between a node therebetween and an analog ground, emitters or sources of third and fourth transistors are connected to each other, a second resistor is connected between a node therebetween and the analog ground, bases or gates of the first to fourth transistors are connected to a constant voltage source, collectors or drains of the second and third transistors are connected to each other, a fifth resistor is connected between the collectors or drains and a power supply line, and third and fourth resistors are connected between the collectors or drains of the first and fourth transistors and the power supply line, respectively.

9. A mechanical force sensor according to claim 1, wherein the phase-difference signal processing circuit is a differential phase difference-voltage converter circuit that receives a differential input of the output voltage signals of the current-voltage converter circuit and that outputs a voltage signal representing a phase difference.

10. A mechanical force sensor according to claim 1, wherein resistors are connected respectively in series with the at least two piezoelectric vibrators.

11. A mechanical force sensor according to claim 1, wherein the mechanical force is an acceleration.

12. A mechanical force sensor according to claim 1, wherein the mechanical force is an angular acceleration.

13. A mechanical force sensor according to claim 1, wherein the mechanical force is an angular velocity.

14. A mechanical force sensor according to claim 1, wherein the mechanical force is a load.

15. A mechanical force sensor according to claim 1, further comprising an insulating case and a center-impeller beam structure, wherein the at least two piezoelectric vibrators are supported by the center-impeller beam structure in the insulating case.

16. A mechanical force sensor according to claim 1, wherein the at least two piezoelectric vibrators are unimorph detecting devices.

17. A mechanical force sensor according to claim 1, wherein the at least two piezoelectric vibrators include both energy-trap type thickness-shear vibration-mode resonators.

18. A mechanical force sensor according to claim 1, further comprising a summing circuit for summing the signals from the current-voltage converter circuit when the signals are current signals.

19. A mechanical force sensor according to claim 1, further comprising a summing circuit for summing the signals from the current-voltage converter circuit after the current signals have been converted into voltage signals.

* * * * *